(12) United States Patent
Tian et al.

(10) Patent No.: US 8,933,588 B2
(45) Date of Patent: Jan. 13, 2015

(54) METHOD AND DEVICE FOR CONTROLLING INTERNAL COMBUSTION ENGINE DRIVEN GENERATOR SET TO RUN IN PARALLEL

(75) Inventors: Hui Tian, Chongqing (CN); Yu Long, Chongqing (CN)

(73) Assignee: Loncin Motor Co., Ltd., Chongqing (CN)

(*) Notice: Subject to any disclaimer, the term of this patent is extended or adjusted under 35 U.S.C. 154(b) by 0 days.

(21) Appl. No.: 14/005,199

(22) PCT Filed: Mar. 1, 2012

(86) PCT No.: PCT/CN2012/071833
§ 371 (c)(1),
(2), (4) Date: Sep. 13, 2013

(87) PCT Pub. No.: WO2012/122896
PCT Pub. Date: Sep. 20, 2012

(65) Prior Publication Data
US 2014/0001873 A1 Jan. 2, 2014

(30) Foreign Application Priority Data
Mar. 15, 2011 (CN) .......................... 2011 1 0061280

(51) Int. Cl.
*H02J 1/00* (2006.01)
*H02J 3/00* (2006.01)
*G06F 19/00* (2011.01)
(Continued)

(52) U.S. Cl.
CPC . *H02J 3/42* (2013.01); *F02D 29/06* (2013.01); *H02P 9/04* (2013.01); *F02B 63/042* (2013.01)
USPC ............................................. 307/87; 701/101

(58) Field of Classification Search
USPC ................. 307/9.1, 10.1, 87; 701/101
See application file for complete search history.

(56) References Cited

U.S. PATENT DOCUMENTS 8,712,666 B2 * 4/2014 Long et al. .................... 701/101

FOREIGN PATENT DOCUMENTS

| CN | 1319946 A | 10/2001 |
|---|---|---|
| CN | 101127503 A | 2/2008 |

(Continued)

OTHER PUBLICATIONS

International Search Report PCT/CN2012/071833, dated May 31, 2012.*

(Continued)

*Primary Examiner* — Rexford Barnie
*Assistant Examiner* — Rasem Mourad
(74) *Attorney, Agent, or Firm* — Alston & Bird LLP (57) ABSTRACT

Provided are a method and a device for controlling an internal combustion engine driven generator set to run in parallel. The method includes: each time an internal combustion engine is started, a controller detects whether a voltage is outputted in an output voltage circuit; obtaining of respective active power and effective values of output currents; seeking of corresponding output voltage amplitudes in respective droop characteristic curves according to the effective values of the respective output currents, and seeking of corresponding inner power factor angles in the respective droop characteristic curves according to the respective active power; the droop characteristic curves of each generator have the same slope; and each generator is controlled to reach the respective corresponding output voltage amplitudes and inner power factor angles.

21 Claims, 6 Drawing Sheets

(51) Int. Cl.
*G06G 7/70* (2006.01)
*H02J 3/42* (2006.01)
*F02D 29/06* (2006.01)
*H02P 9/04* (2006.01)
*F02B 63/04* (2006.01)

(56) References Cited

FOREIGN PATENT DOCUMENTS

| CN | 101310434 A | 11/2008 |
|---|---|---|
| CN | 101505129 A | 8/2009 |
| CN | 101640423 A | 2/2010 |
| CN | 102307036 A | 1/2012 |
| JP | 9-135538 A | 5/1997 |

OTHER PUBLICATIONS

JP9-135538A (Nippon Sharyo Seizo KK).*
Written Opinion of the International Searching Authority for Application No. PCT/CN2012/071833, dated May 31, 2012.
Huang, Lunkun et al., *Ship Power Station and Automatic Equipment Thereof*, pp. 225-360, ISBN 7-114-01747-2 (May 1994).
International Search Report for Application No. PCT/CN2012/071833, dated May 31, 2012.

* cited by examiner

METHOD AND DEVICE FOR CONTROLLING INTERNAL COMBUSTION ENGINE DRIVEN GENERATOR SET TO RUN IN PARALLEL

TECHNICAL FIELD OF THE INVENTION

The present invention relates to the technical field of generator control, and in particular to a method and a device for controlling an internal combustion engine driven generator set to run in parallel.

BACKGROUND OF THE INVENTION

Components and working principles of an internal combustion engine driven generator will be introduced first below.

Figure 1:
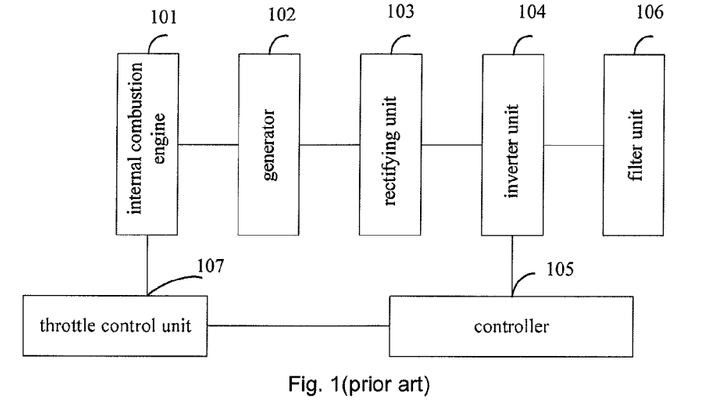
FIG. 1 is a structural diagram of an internal combustion engine driven generator in the prior art.

Referring to FIG. 1, the figure is a structural diagram of an internal combustion engine driven generator in the prior art.

An internal combustion engine driven generator 101, functioning as a prime motor, drives a generator 102 to generate electricity. An alternating current outputted by the generator 102 is rectified into a direct current by a rectifying unit 103, and the direct current is outputted to an inverter unit 104 subsequently. Controlled by a controller 105, the inverter unit 104 inverts the direct current into a required alternating current which is provided to a load after being filtered by a filter unit 106. At the same time, the controller 105 controls the opening degree of the throttle of the internal combustion engine 101 through a throttle controller 107.

The generator needs to provide relatively large power output in some application scenarios. However, the requirement may not be satisfied by one generator. For example, the output power of one generator is 1.6 kW, but a power of 3 kW is required by a load. In this way, two generators connected in parallel are needed to provide power for the load.

Figure 2:
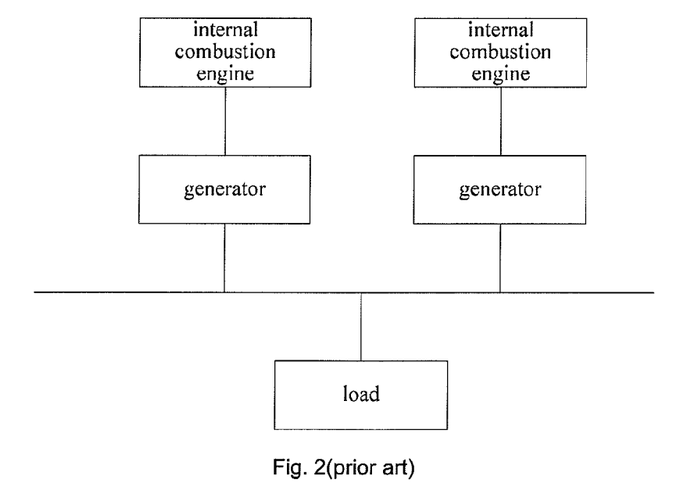
FIG. 2 is a schematic diagram illustrating a plurality of generators connected in parallel to provide power for a load in the prior art.

As shown in FIG. 2, the figure is a schematic diagram illustrating a plurality of generators connected in parallel to provide power for a load in the prior art.

The parallel system includes two generators, each of which corresponds to an internal combustion engine. The output ends of the generators are connected in parallel to provide power for the load.

Since power supply to a load by two generators connected in parallel and a photovoltaic inversion connected grid are two power supply methods which are completely different. The photovoltaic inversion connected grid only needs the same phase and frequency as those of a power grid and does not need to realize power balance among generators connected in parallel during photovoltaic inversion. However, power balance needs to be realized among generators to supply power to a load by generators connected in parallel.

Therefore, how to control internal combustion engine driven generators to run in parallel is a problem to be solved by those skilled in the art.

SUMMARY OF THE INVENTION

A solution to solve the technical problem of the present invention is to provide a method and a device for controlling an internal combustion engine driven generator set to run in parallel so that automatic power balance among generator sets running in parallel is implemented.

The present invention provides a method for controlling an internal combustion engine driven generator set to run in parallel, comprising the following steps:

each time an internal combustion engine is started, a controller of each generator detecting whether a voltage is outputted in an output voltage circuit, if it is detected that the voltage is outputted, a generator acts as a slave generator, and synchronizes phases of the output voltage of the generator and the detected voltage by taking the phase of the detected voltage as reference, and if it is detected that no voltage is outputted, the generator acts as a master generator; obtaining of active power and effective values of output currents of respective generators;

seeking of corresponding output voltage amplitudes in respective droop characteristic curves according to the effective values of the respective output currents, and seeking of corresponding inner power factor angles in the respective droop characteristic curves according to the respective active power, wherein the droop characteristic curves of each generator include an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave and a phase of an output voltage;

each generator being controlled to reach the respective corresponding output voltage amplitudes and inner power factor angles.

Preferably, obtaining the active power of each generator specifically includes:

detecting the output voltage and the output current of each generator in real time;

obtaining the active power by Formula $$P = \frac{1}{T}\sum_{t=0}^{T}[U(t) \times I(t)\Delta t],$$

where P represents the active power; U(t) represents the generator output voltage corresponding to sampling moment t; I(t) represents the generator output current corresponding to sampling moment t; T represents the period of the output voltage; and $\Delta t$ represents a sampling time interval.

Preferably, detecting the output voltage of each generator specifically includes:

rectifying the output voltage of a filter unit; perform analog-to-digital conversion for the rectified voltage to obtain the output voltage.

Preferably, obtaining of the effective values of the output currents of the respective generators specifically includes:

performing positive amplitude conversion for the output currents of the filter unit acquired by a current acquisition transformer to obtain the effective values of the output currents.

Preferably, controlling each generator to reach the respective corresponding output voltage amplitudes specifically includes:

adjusting the output voltage amplitudes by adjusting the coefficient of the sine amplitude for generating the PWM wave.

Preferably, controlling each generator to reach the respective corresponding inner power factor angles specifically includes:

adjusting the phase of the inner power factor angle by adjusting the phase of the PWM wave.

Preferably, detecting the phase of the output voltage of each generator specifically includes:

rectifying the output voltage of the filter unit; perform square wave conversion for the rectified voltage to obtain the phase of the output voltage, or perform peak conversion for the rectified voltage to obtain the phase of the output voltage.

The present invention further provides a device for controlling an internal combustion engine driven generator set to run in parallel, including:

a detecting unit configured to, each time an internal combustion engine is started, detect whether a voltage is outputted in an output voltage circuit, if it is detected that the voltage is outputted, a generator act as a slave generator, and synchronize phases of the output voltage of itself and the detected voltage by taking the phase of the detected voltage as reference, and if it is detected that no voltage is outputted, the generator act as a master generator;

a power obtaining unit configured to obtain active power of respective generators;

an output current obtaining unit configured to obtain effective values of output currents of the respective generators;

a seeking unit configured to seek corresponding output voltage amplitudes in respective droop characteristic curves according to the effective values of the respective output currents, and seek corresponding inner power factor angles in the respective droop characteristic curves according to the respective active power, wherein the droop characteristic curves of each generator include an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of the output voltage;

a control unit configured to control each generator to reach the respective corresponding output voltage amplitudes and inner power factor angles.

Preferably, the power obtaining unit includes:

an output voltage detecting sub-unit configured to detect the output voltage of each generator in real time;

an output current detecting sub-unit configured to detect the output current of each generator in real time;

a calculating sub-unit configured to obtain the active power by Formula $$P = \frac{1}{T}\sum_{t=0}^{T}[U(t) \times I(t)\Delta t],$$

where P represents the active power; U(t) represents the generator output voltage corresponding to sampling moment t; I(t) represents the generator output current corresponding to sampling moment t; T represents the period of the output voltage; and Δt represents a sampling time interval.

Preferably, detecting the output voltage by the output voltage detecting sub-unit specifically includes: rectifying the output voltage of a filter unit and perform analog-to-digital conversion for the rectified voltage to obtain the output voltage.

Preferably, an output voltage phase detecting unit is further comprised and configured to rectify the output voltage of the filter unit; perform square wave conversion for the rectified voltage to obtain the phase of the output voltage, or perform peak conversion for the rectified voltage to obtain the phase of the output voltage.

Preferably, the output current obtaining unit is configured to obtain the effective values of the output currents of the respective generators, specifically including: perform positive amplitude conversion for the output currents of a filter unit acquired by a current acquisition transformer to obtain the effective values of the output currents.

Preferably, the control unit adjusts the output voltage amplitude by adjusting the coefficient of the sine amplitude for generating the PWM wave and adjusts the phase of the inner power factor angle by adjusting the phase of the PWM wave.

The present invention further provides a method for controlling an internal combustion engine driven generator set to run in parallel, including:

obtaining active power and effective values of output currents of respective generators;

seeking of corresponding output voltage amplitudes in droop characteristic curves of respective generators according to the effective values of the output currents, and seeking of corresponding inner power factor angles in the droop characteristic curves of the respective generators according to the active power, wherein the droop characteristic curves of each generator include an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of an output voltage;

each generator being controlled to reach the respective corresponding output voltage amplitudes and inner power factor angles.

The present invention further provides a device for controlling an internal combustion engine driven generator set to run in parallel, including:

a power obtaining unit configured to obtain active power of respective generators;

an output current obtaining unit configured to obtain effective values of output currents of the respective generators;

a seeking unit configured to seek corresponding output voltage amplitudes in droop characteristic curves of respective generators according to the effective values of the output currents, and seek corresponding inner power factor angles in the droop characteristic curves of the respective generators according to the active power, wherein the droop characteristic curves of each generator include an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of an output voltage;

a control unit configured to control each generator to reach the respective corresponding output voltage amplitudes and inner power factor angles.

Compared with the prior art, the present invention has the following advantages:

according to a method for controlling an internal combustion engine driven generator set to run in parallel of the present invention, droop characteristic curves are preset for each generator and the droop characteristic curves of each generator have the same slope. Therefore, output voltage amplitudes and inner power factor angles may be controlled by feeding back output currents and active power so that automatic power balance among generators connected in parallel is implemented. When the multiple generators run in parallel, no additional device needs to be added, and a user does not need to perform any operation.

DETAILED DESCRIPTION OF THE INVENTION

To make those skilled in the art better understand and implement the present invention, principles, on which the present application is based, of generators connected in parallel will be introduced below first.

A formula for obtaining generator output power through the principles of the generators connected in parallel is as follows:

$$P = \frac{U_d U \theta}{C} \quad (1)$$

$$S^2 = P^2 + Q^2 \quad (2)$$

$$S = UI \quad (3)$$

where P represents the active power outputted by a generator; Q represents the inactive power outputted by the generator; S represents the apparent power of the generator; $U_d$ represents the load voltage; U represents the output voltage of the generator; I represents the output current of the generator; X represents the internal resistance of the generator; and θ represents the inner power factor angle of the generator.

It can be concluded through analyzing Formula (1) that the active power P is directly proportional to the inner power factor angle θ of the generator; the active power is outputted in the case of θ phase leading and the active power is absorbed in the case of θ phase lagging.

Relations among the inactive power Q, the active power P and the apparent power S may be obtained by analyzing Formula (2). P and S may be adjusted to adjust Q. In order to simplify calculation, S may be calculated through U and I, and the inactive power may be adjusted indirectly by directly adjusting S.

Since the apparent power S is directly proportional to the amplitude of the output voltage U of the generator, the inactive power is outputted in the case of a high amplitude of the output voltage U and the inactive power is absorbed in the case of a low amplitude of the output voltage U.

Therefore, the present application adjusts the active power by adjusting the inner power factor angle of the generator, adjusts the amplitude of the output voltage of the generator to adjust the apparent power, and adjusts the inactive power indirectly.

It should be noted that an inner power factor angle of an internal combustion engine driven generator is the phase difference between the phase of a PWM wave outputted by a controller and the phase of the output voltage U. The PWM wave outputted by the controller is used for controlling the on/off states of each switching tube in an inverter unit. Therefore, the inner power factor angle of the generator may be obtained by the controller through calculating the phase of the PWM wave and the U phase.

To make the above purposes, characteristics and advantages of the present invention more apparent and easily understood, specific embodiments of the present invention will be described in details below in combination with the accompanying drawings.

Figure 3A:
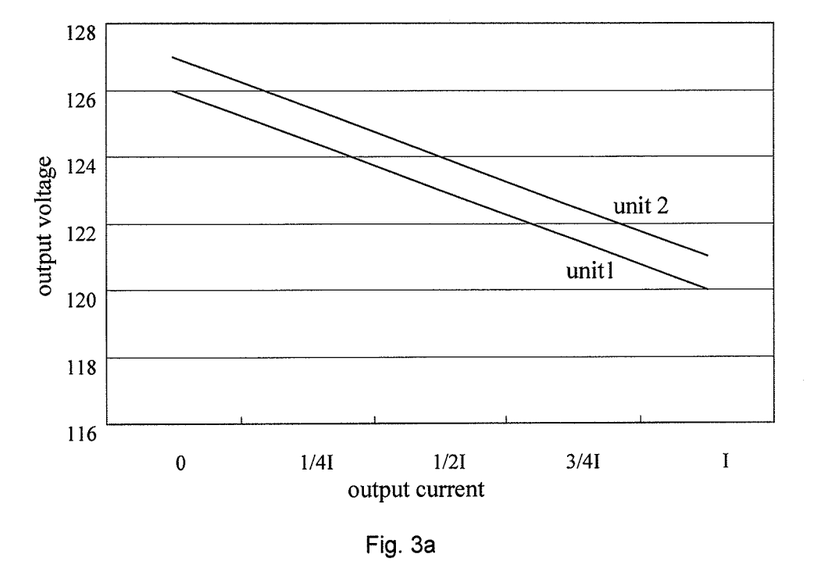
FIG. 3a illustrates output voltage-output current characteristic curves of two generators provided by the present invention.
Figure 3B:
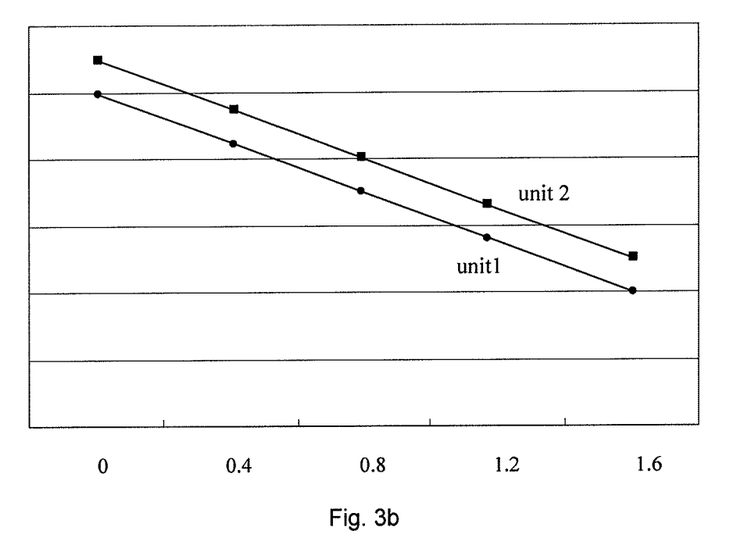
FIG. 3b illustrates inner power factor angle-active power characteristic curves of two generators provided by the present invention.

Although a plurality of generators are connected in parallel to supply power for a load, each generator is controlled independently and only running of each generator is controlled according to droop characteristic curves. In addition, the droop characteristic curves of each generator have the same slope and include an output voltage-output current characteristic curve and an inner power factor angle-active power characteristic curve, specifically referring to FIG. 3a and FIG. 3b. FIG. 3a illustrates output voltage-output current characteristic curves of two generators provided by the present invention and FIG. 3b illustrates inner power factor angle-active power characteristic curves of two generators provided by the present invention, wherein unit 1 represents a generator and unit 2 represent the other generator.

Wherein the ordinate of an output voltage-output current characteristic curve is the output voltage (unit: V) and the abscissa is the output current (unit: A).

The ordinate of an inner power factor angle-active power characteristic curve is the inner power factor angle (unit: degree) and the abscissa is the active power (unit: kW).

An example of two generators running in parallel will be illustrated below. Principles of a plurality of generators running in parallel are the same as those of two generators running in parallel, which will not be repeated here.

After phases of the two generators are synchronized, the power of the two generators needs to be controlled to realize balanced distribution.

It can be learned from the analysis above that it only needs to control output voltage amplitudes and inner power factor angles of the generators to implement power balance of the units connected in parallel. Balanced distribution of power can be implemented automatically as long as each generator runs according to preset droop characteristic curves. Therefore, a control method provided by an embodiment of the present invention needs to control each generator to run on its own droop characteristic curves.

Figure 4:
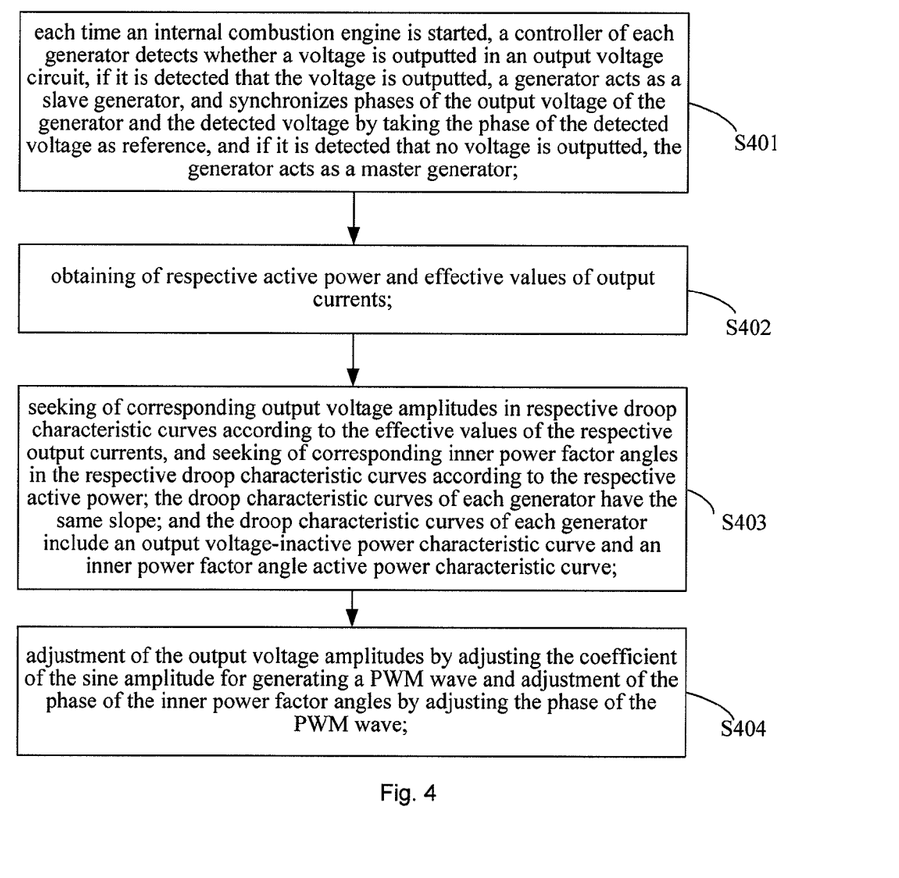
FIG. 4 is a flowchart of the first embodiment of a method for controlling an internal combustion engine driven generator set to run in parallel of the present invention.

Referring to FIG. 4, the figure is a flowchart of the first embodiment of a method for controlling an internal combustion engine driven generator set to run in parallel of the present invention.

The method for controlling an internal combustion engine driven generator set to run in parallel of the present embodiment includes the following steps:

Step 401: each time an internal combustion engine is started, a controller of each generator detects whether a voltage is outputted in an output voltage circuit, if it is detected that the voltage is outputted, a generator acts as a slave generator, and synchronizes phases of the output voltage of the generator and the detected voltage by taking the phase of the detected voltage as reference, and if it is detected that no voltage is outputted, the generator acts as a master generator;

when a plurality of generators are connected in parallel, a generator is started first as a master generator, and slave generators run synchronously with the master generator in order to synchronize phases.

Step 402: obtaining of respective active power and/or effective values of output currents;

Step 403: seeking of corresponding output voltage amplitudes in respective droop characteristic curves according to the effective values of the respective output currents, and seeking of corresponding inner power factor angles in the respective droop characteristic curves according to the respective active power; the droop characteristic curves of each generator have the same slope; and the droop characteristic curves of each generator include an output voltage-output current characteristic curve (U-I) and an inner power factor angle-active power characteristic curve (θ-P);

the corresponding θ is obtained by looking up the θ-P curve according to P and the corresponding U is obtained by looking up U-I according to Q.

Step 404: control each generator to reach the respective corresponding output voltage amplitudes and inner power factor angles θ.

The method provided by the present embodiment applies the manner that the output voltage amplitudes and the output voltage phases change according to the preset droop characteristic curves, thus automatic power balance between the generators running in parallel without communication lines are implemented.

During an inactive power distribution process or load disturbance, output voltage amplitudes of units running in parallel have droop change according to a preset slope. Output voltage amplitudes of generators having high output inactive power decrease more while output voltage amplitudes of generators having low output inactive power decrease less. In this way, the output inactive power of the generators having high output inactive power originally starts to decrease with the decrease of the output voltage amplitudes of the generators, and excessive load inactive power is undertaken by the generators having low output inactive power originally. Since droop characteristic curves, based on which the output voltage amplitudes of the units running in parallel decrease, have the same slope, automatic balance for inactive power distribution will be finally implemented in the generators running in parallel.

During an active power distribution process or load disturbance, inner power factor angles of the units running in parallel have droop change according to a preset slope. Inner power factor angles of generators having high output active power are relatively large while inner power factor angles of generators having low output active power are small. Controllers of the generators having high output active power control an inverter unit to output a PWM phase to perform great lagging adjustment so that the inner power factor angles lag a relatively large angle. Controllers of the generators having low output active power control the inverter unit to output a PWM phase to perform slight lagging adjustment so that the inner power factor angles lag a relatively small angle. Because of the change of the inner power factor angles, the output active power of the generators having high output active power originally will decrease with the decrease of the inner power factor angles of the generators, and excessive load active power will be undertaken by the generators having low output active power originally. Since the droop characteristic curves, based on which the inner power factor angles of the generators running in parallel decrease, have the same slope, automatic balance for active power distribution will be finally implemented in the generators running in parallel.

According to the method for controlling an internal combustion engine driven generator set to run in parallel of the present invention, droop characteristic curves are preset for each generator and the droop characteristic curves of each generator have the same slope. Therefore, output voltage amplitudes and inner power factor angles may be controlled respectively by feeding back output currents and active power so that automatic power balance among generators connected in parallel is implemented. When the multiple generators run in parallel, no additional device needs to be added, and a user does not need to perform any operation.

Figure 5:
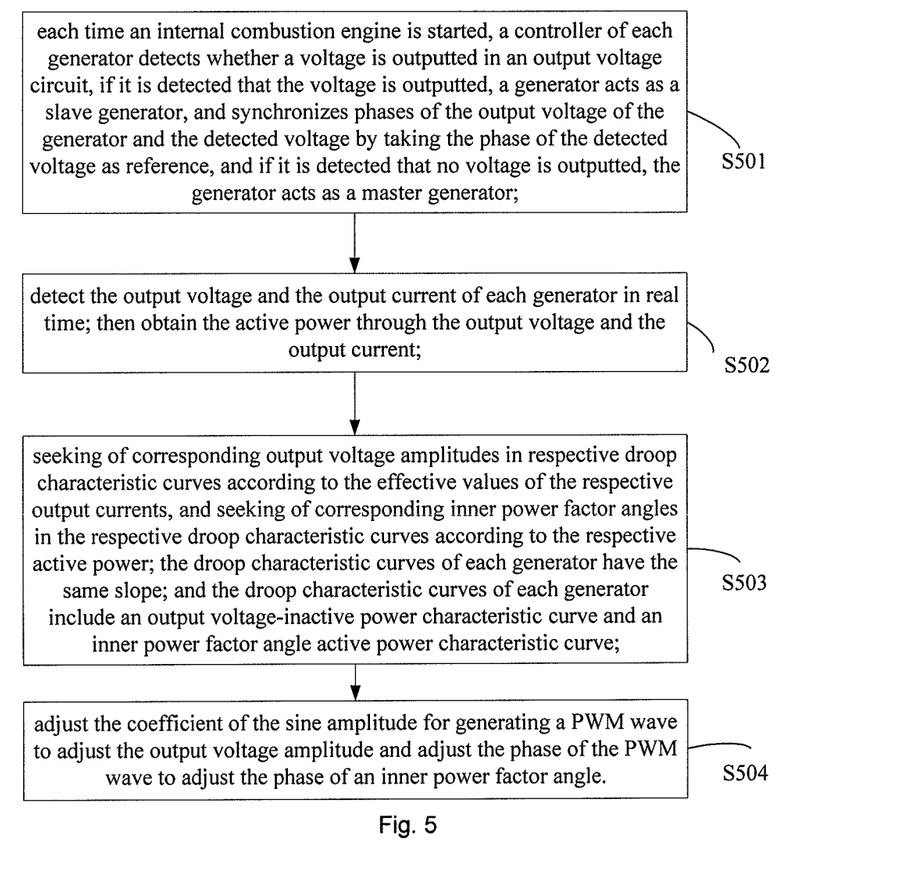
FIG. 5 is a flowchart of the second embodiment of a control method provided by the present invention.

Referring to FIG. 5, the figure is a flowchart of the second embodiment of a control method provided by the present invention.

Step 501 is the same as Step 401 and will not be repeated here.

Step 502: obtaining of the active power of each generator specifically includes:

detecting an output voltage and an output current of each generator in real time;

then obtaining the active power by Formula $$P = \frac{1}{T}\sum_{t=0}^{T}[U(t) \times I(t)\Delta t],$$

where P represents the active power; U(t) represents the generator output voltage corresponding to sampling moment t; I(t) represents the generator output current corresponding to sampling moment t; T represents the period of the output voltage; and Δt represents a sampling time interval.

Specifically methods for obtaining U and I will be introduced below:

detecting the output voltage of each generator in real time specifically includes:

rectifying an output voltage of a filter unit; perform analog-to-digital conversion for the rectified voltage to obtain the output voltage;

since a controller can only detect a positive value, but cannot detect a negative value, an alternating current output voltage needs to be rectified and then detected.

Since an inner power factor angle is the phase difference between a phase of a PWM wave and a phase of an output voltage, the inner power factor angle needs to be obtained through the phase of the output voltage and the phase of the PWM wave. Since the phase of the PWM wave has been acquired by a control unit, it only needs to detect the phase of the output voltage.

Detecting the phase of the output voltage of each generator specifically includes:

rectifying the output voltage of the filter unit; perform square wave conversion for the rectified voltage to obtain the phase of the output voltage, or perform peak conversion for the rectified voltage to obtain the phase of the output voltage.

Figure 6:
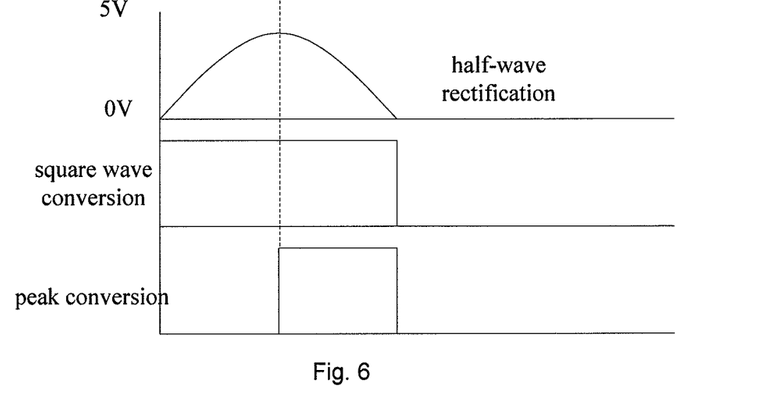
FIG. 6 is a schematic diagram illustrating square wave conversion and peak conversion of an output voltage of the present invention.

A diagram illustrating voltage square wave conversion and peak conversion may refer to FIG. 6. Since half-wave rectification is performed for the output voltage of the filter unit, the voltage having undergone the half-wave rectification only has half of a positive period, the waveform having undergone the square-wave conversion has half a period and the waveform having undergone the peak conversion has a quarter of a period.

When a load is a linear load, the output voltage obtained through the square wave conversion and the output voltage obtained through the peak conversion have the same phase. When the load is a nonlinear load, the output voltage obtained through the square wave conversion and the output voltage obtained through the peak conversion have different phases. At the moment, the phase of the output voltage obtained through the peak conversion prevails.

Figure 7:
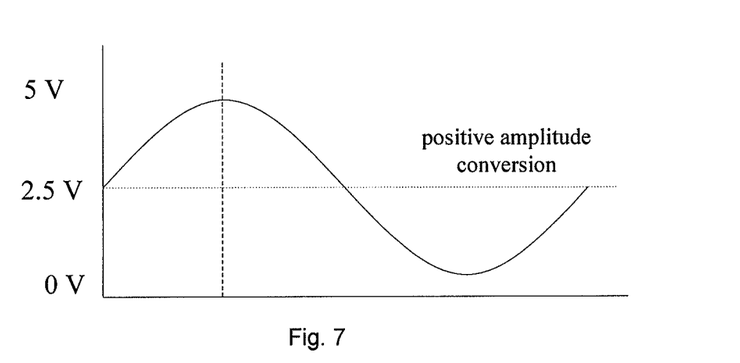
FIG. 7 is a schematic diagram illustrating positive amplitude conversion of an output current of the present invention.

Detecting the effective value of the output current of each generator specifically includes:

performing positive amplitude conversion for the output current of a filter unit acquired by a current acquisition transformer to obtain the effective value of the output current;

the positive amplitude conversion of the output current may refer to FIG. 7.

Since the output current is not rectified, positive amplitude conversion needs to be performed for the output current first to convert the output current into a positive output current. The positive amplitude conversion of the output current converts a positive current or a negative current into a positive current. It can be learned from FIG. 7 that, the zero-crossing point of the output current is increased to 2.5V.

Step 503 is the same as Step 403 and will not be repeated here.

Step 504: adjust the coefficient of the sine amplitude for generating a PWM wave to adjust the output voltage amplitude, and adjust the phase of the PWM wave to adjust the phase of an inner power factor angle.

Based on the above provided method for controlling an internal combustion engine driven generator set to run in parallel, the present invention further provides a device for controlling an internal combustion engine driven generator set to run in parallel. Components of the device will be described in details below in combination with specific embodiments.

Figure 8:
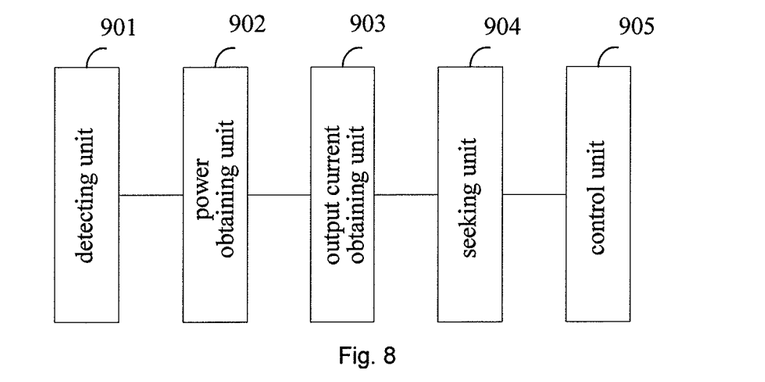
FIG. 8 is a structural diagram of the first embodiment of a device for controlling an internal combustion engine driven generator set to run in parallel of the present invention.

Referring to FIG. 8, the figure is a structural diagram of the first embodiment of a device for controlling an internal combustion engine driven generator set to run in parallel of the present invention.

It should be noted that, although a plurality of generators run in parallel, each generator runs independently. Therefore, the control device provided by the present embodiment is applicable to each parallel generator, and the generators have the same working principles.

The device for controlling an internal combustion engine driven generator set to run in parallel of the present embodiment includes:

a detecting unit 901 configured to, each time an internal combustion engine is started, detect whether a voltage is outputted in an output voltage circuit, if it is detected that the voltage is outputted, a generator act as a slave generator, and synchronize phases of the output voltage of itself and the detected voltage by taking the phase of the detected voltage as reference, and if it is detected that no voltage is outputted, the generator act as a master generator;

when a plurality of generators are connected in parallel, a generator is started first as a master generator, and slave generators run synchronously with the master generator in order to synchronize phases.

the detecting unit 901 of each generator detects whether there is a voltage on the voltage circuit to determine a master generator and slave generators in the parallel generator set;

a power obtaining unit 902 configured to obtain respective active power;

an output current obtaining unit 903 configured to obtain effective values of output currents;

the power obtaining unit 902 of each generator detects the active power outputted by the generator;

a seeking unit 904 configured to seek corresponding output voltage amplitudes in respective droop characteristic curves according to the effective values of the respective output currents, and seek corresponding inner power factor angles in the respective droop characteristic curves according to the respective active power; the droop characteristic curves of each generator have the same slope; the droop characteristic curves of each generator include an output voltage-output current characteristic curve and an inner power factor angle-active power characteristic curve; an inner power factor angle is the phase difference between a phase of a PWM wave and a phase of an output voltage;

the droop characteristic curves may refer to FIG. 3a and FIG. 3b and are introduced by taking two generators running in parallel for example.

a control unit 905 configured to control each generator to reach the respective corresponding output voltage amplitudes and inner power factor angles.

The control unit 905 adjusts the coefficient of the sine amplitude for generating a PWM wave to adjust the output voltage amplitudes. Since the inner power factor angle is the phase difference between the phase of the PWM wave and the phase of the output voltage, the control unit 905 adjusts the phase of the PWM wave to adjust the phase of the inner power factor angle.

The method provided by the present embodiment applies the manner that the output voltage amplitudes and the output voltage phases change according to the preset droop characteristic curves, thus automatic power balance between the generators running in parallel without communication lines are implemented.

According to the device for controlling an internal combustion engine driven generator set to run in parallel of the present invention, droop characteristic curves are preset for each generator and the droop characteristic curves of each generator have the same slope. Therefore, output voltage amplitudes and inner power factor angles may be controlled by feeding back effective values of output currents and active power so that automatic power balance among generators connected in parallel is implemented. When the multiple generators run in parallel, no additional device needs to be added, and a user does not need to perform any operation.

Figure 9:
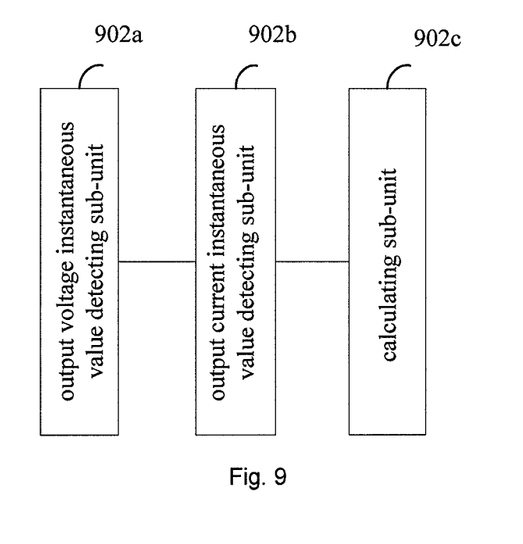
FIG. 9 is a structural diagram of a power obtaining unit provided by the present invention.

Referring to FIG. 9, the figure is a structural diagram of the second embodiment of a control device provided by the present invention.

The present embodiment mainly introduces the structure of a power obtaining unit in the control device, including:
an output voltage detecting sub-unit 902a configured to detect an output voltage of each generator;
detecting the output voltage by the output voltage detecting sub-unit 902a specifically includes: rectify the output voltage of a filter unit and perform analog-to-digital conversion for the rectified voltage to obtain the output voltage;
an output current detecting sub-unit 902b configured to detect an output current of each generator;
a calculating sub-unit 902c configured to obtain the active power by Formula $$P = \frac{1}{T}\sum_{t=0}^{T}[U(t) \times I(t)\Delta t],$$

where P represents the active power; U(t) represents the generator output voltage corresponding to sampling moment t; I(t) represents the generator output current corresponding to sampling moment t; T represents the period of the output voltage; and Δt represents a sampling time interval.

Figure 10:
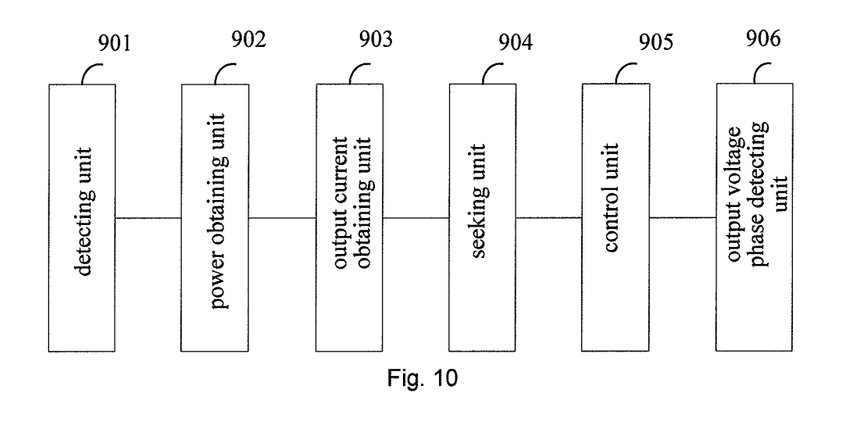
FIG. 10 is a structural diagram of the second embodiment of a control device provided by the present invention.

Referring to FIG. 10, the figure is a structural diagram of another embodiment of a device provided by the present invention.

The device provided by the present embodiment further includes an output voltage phase detecting unit 906. Since an inner power factor angle is the phase difference between a phase of a PWM wave and a phase of an output voltage, the inner power factor angle needs to be obtained through the phase of output voltage and the phase of the PWM wave. Since the phase of the PWM wave has been acquired by a control unit, it only needs to detect the phase of the output voltage. The output voltage phase detecting unit 906 is configured to detect the phase of an output voltage of each generator.

Detecting the phase of the output voltage by the output voltage phase detecting unit 906 specifically includes: rectify the output voltage of the filter unit; perform square wave conversion for the rectified voltage to obtain the phase of the output voltage, or perform peak conversion for the rectified voltage to obtain the phase of the output voltage.

When a load is a linear load, the output voltage obtained through the square wave conversion and the output voltage obtained through the peak conversion have the same phase. When the load is a nonlinear load, the output voltage obtained through the square wave conversion and the output voltage obtained through the peak conversion have different phases. At the moment, the phase of the output voltage obtained through the peak conversion prevails.

The output current obtaining unit 903 is configured to detect the effective value of an output current of each generator;
detecting the effective value of the output current by the output current obtaining unit 903 specifically includes: perform positive amplitude conversion for the output current of the filter unit acquired by a current acquisition transformer to obtain the effective value of the output current.

The above are merely the preferred embodiments of the present invention and are not intended to limit the present invention in any form. Although the present invention has been disclosed by the preferred embodiments as mentioned above, the preferred embodiments are not used for limiting the present invention. Many possible variations and modifications may be made to the technical solutions of the present invention, or the technical solutions of the present invention may be modified into equivalent embodiments changed equivalently, without departing from the scope of the technical solutions of the present invention by any person skilled in the art by using the methods and technical contents as disclosed above. Therefore, any simple modifications, equivalent changes and modifications made to the embodiments above according to the technical essence of the present invention without departing from the contents of the technical solutions of the present invention shall belong to the scope of protection of the technical solutions of the present invention.

The invention claimed is:

1. A method for controlling an internal combustion engine driven generator set to run in parallel, wherein it comprises the following steps:
each time an internal combustion engine is started, a controller of each generator detecting whether a voltage is outputted in an output voltage circuit, if it is detected that the voltage is outputted, a generator acts as a slave generator, and synchronizes phases of the output voltage of the generator and the detected voltage by taking the phase of the detected voltage as reference, and if it is detected that no voltage is outputted, the generator acts as a master generator;
obtaining of active power and effective values of output currents of respective generators;
seeking of corresponding output voltage amplitudes in respective droop characteristic curves according to the effective values of the respective output currents, and seeking of corresponding inner power factor angles in the respective droop characteristic curves according to the respective active power, wherein the droop characteristic curves of each generator comprises an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of the output voltage;
each generator being controlled to reach the respective corresponding output voltage amplitudes and inner power factor angles.

2. The method for controlling an internal combustion engine driven generator set to run in parallel according to claim 1, wherein obtaining the active power of each generator specifically comprises:
   detecting the output voltage and the output current of each generator in real time;
   obtaining the active power by Formula $$P = \frac{1}{T}\sum_{t=0}^{T}[U(t) \times I(t)\Delta t],$$

where P represents the active power; U(t) represents the output voltage of the generator corresponding to sampling moment t; I(t) represents the output current of the generator corresponding to sampling moment t; T represents the period of the output voltage; and Δt represents a sampling time interval.

3. The method for controlling an internal combustion engine driven generator set to run in parallel according to claim 2, wherein detecting the output voltage of each generator specifically comprises:
   rectifying the output voltage of a filter unit; performing analog-to-digital conversion for the rectified voltage to obtain the output voltage.

4. The method for controlling an internal combustion engine driven generator set to run in parallel according to claim 1, wherein obtaining of the effective values of the output currents of the respective generators specifically comprises:
   performing positive amplitude conversion for the output currents of the filter unit acquired by a current acquisition transformer to obtain the effective values of the output currents.

5. The method for controlling an internal combustion engine driven generator set to run in parallel according to claim 1, wherein controlling each generator to reach the respective corresponding output voltage amplitudes specifically comprises:
   adjusting the output voltage amplitudes by adjusting the coefficient of the sine amplitude for generating the PWM wave.

6. The method for controlling an internal combustion engine driven generator set to run in parallel according to claim 1, wherein controlling each generator to reach the respective corresponding inner power factor angles specifically comprises:
   adjusting the phase of the inner power factor angle by adjusting the phase of the PWM wave.

7. The method for controlling an internal combustion engine driven generator set to run in parallel according to claim 1, wherein detecting the phase of the output voltage of each generator specifically comprises:
   rectifying the output voltage of the filter unit; performing square wave conversion for the rectified voltage to obtain the phase of the output voltage, or performing peak conversion for the rectified voltage to obtain the phase of the output voltage.

8. A device for controlling an internal combustion engine driven generator set to run in parallel, wherein it comprises:
   a detecting unit configured to, each time an internal combustion engine is started, detect whether a voltage is outputted in an output voltage circuit, if it is detected that the voltage is outputted, a generator act as a slave generator, and synchronize phases of the output voltage of itself and the detected voltage by taking the phase of the detected voltage as reference, and if it is detected that no voltage is outputted, the generator act as a master generator;
   a power obtaining unit configured to obtain active power of respective generators;
   an output current obtaining unit configured to obtain effective values of output currents of the respective generators;
   a seeking unit configured to seek corresponding output voltage amplitudes in respective droop characteristic curves according to the effective values of the respective output currents, and seek corresponding inner power factor angles in the respective droop characteristic curves according to the respective active power, wherein the droop characteristic curves of each generator comprises an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of the output voltage;
   a control unit configured to control each generator to reach the respective corresponding output voltage amplitudes and inner power factor angles.

9. The device for controlling an internal combustion engine driven generator set to run in parallel according to claim 8, wherein the power obtaining unit comprises:
   an output voltage detecting sub-unit configured to detect the output voltage of each generator in real time;
   an output current detecting sub-unit configured to detect the output current of each generator in real time;
   a calculating sub-unit configured to obtain the active power by Formula $$P = \frac{1}{T}\sum_{t=0}^{T}[U(t) \times I(t)\Delta t],$$

where P represents the active power; U(t) represents the output voltage of the generator corresponding to sampling moment t; I(t) represents the output current of the generator corresponding to sampling moment t; T represents the period of the output voltage; and Δt represents a sampling time interval.

10. The device for controlling an internal combustion engine driven generator set to run in parallel according to claim 9, wherein
   detecting the output voltage by the output voltage detecting sub-unit specifically comprises: rectifying the output voltage of a filter unit and performing analog-to-digital conversion for the rectified voltage to obtain the output voltage.

11. The device for controlling an internal combustion engine driven generator set to run in parallel according to claim 8, wherein an output voltage phase detecting unit is further comprised and configured to rectify the output voltage of the filter unit; perform square wave conversion for the rectified voltage to obtain the phase of the output voltage, or perform peak conversion for the rectified voltage to obtain the phase of the output voltage.

12. The device for controlling an internal combustion engine driven generator set to run in parallel according to claim 8, wherein
the output current obtaining unit is configured to obtain the effective values of the output currents of the respective generators, specifically comprising: performing positive amplitude conversion for the output currents of a filter unit acquired by a current acquisition transformer to obtain the effective values of the output currents.

13. The device for controlling an internal combustion engine driven generator set to run in parallel according to claim 8, wherein the control unit adjusts the output voltage amplitude by adjusting the coefficient of the sine amplitude for generating the PWM wave and adjusts the phase of the inner power factor angle by adjusting the phase of the PWM wave.

14. A method for controlling an internal combustion engine driven generator set to run in parallel, wherein it comprises the following steps:
obtaining active power and effective values of output currents of respective generators;
seeking of corresponding output voltage amplitudes in droop characteristic curves of respective generators according to the effective values of the output currents, and seeking of corresponding inner power factor angles in the droop characteristic curves of the respective generators according to the active power, wherein the droop characteristic curves of each generator comprises an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of an output voltage;
each generator being controlled to reach the respective corresponding output voltage amplitudes and inner power factor angles.

15. The method for controlling an internal combustion engine driven generator set to run in parallel according to claim 14, wherein obtaining of the effective values of the output currents of the respective generators specifically comprises: performing positive amplitude conversion for filtered generator output currents acquired by a current acquisition transformer to obtain the effective values of the output currents.

16. The method for controlling an internal combustion engine driven generator set to run in parallel according to claim 14, wherein detecting the phase of the output voltage of each generator specifically comprises: filtering the output voltage of the generator and rectifying the output voltage subsequently; performing square wave conversion or peak conversion for the rectified voltage to obtain the phase of the output voltage.

17. The method for controlling an internal combustion engine driven generator set to run in parallel according to claim 14, wherein controlling each generator to reach the respective corresponding output voltage amplitudes and inner power factor angles specifically comprises:
adjusting the output voltage amplitudes by adjusting the coefficient of the sine amplitude for generating the PWM wave;
adjusting the phase of the inner power factor angles by adjusting the phase of the PWM wave.

18. A device for controlling an internal combustion engine driven generator set to run in parallel, wherein it comprises:
a power obtaining unit configured to obtain active power of respective generators;
an output current obtaining unit configured to obtain effective values of output currents of the respective generators;
a seeking unit configured to seek corresponding output voltage amplitudes in droop characteristic curves of respective generators according to the effective values of the output currents, and seek corresponding inner power factor angles in the droop characteristic curves of the respective generators according to the active power, wherein the droop characteristic curves of each generator comprises an output voltage-output current characteristic curve and an inner power factor angle-active power characteristic curve; in addition, the output voltage-output current characteristic curves of all generators running in parallel have the same slope, and the inner power factor angle-active power characteristic curves of all generators running in parallel have the same slope; the inner power factor angle is the phase difference between the phase of a PWM wave for controlling the state of a switching tube of an inverter unit and the phase of an output voltage;
a control unit configured to control each generator to reach the respective corresponding output voltage amplitudes and inner power factor angles.

19. The device for controlling an internal combustion engine driven generator set to run in parallel according to claim 18, wherein the output current obtaining unit is further configured to: perform positive amplitude conversion for filtered generator output currents acquired by a current acquisition transformer to obtain the effective values of the output currents.

20. The device for controlling an internal combustion engine driven generator set to run in parallel according to claim 18, wherein it further comprises an output voltage phase detecting unit configured to filter the output voltage of the generator and rectify the output voltage subsequently; perform square wave conversion or peak conversion for the rectified generator output voltage to obtain the phase of the output voltage.

21. The device for controlling an internal combustion engine driven generator set to run in parallel according to claim 18, wherein the control unit is further configured to:
adjust the output voltage amplitudes by adjusting the coefficient of the sine amplitude for generating the PWM wave;
adjust the phase of the inner power factor angles by adjusting the phase of the PWM wave.

* * * * *